No. 632,401. Patented Sept. 5, 1899.
B. E. CHOLLAR.
GAS PURIFIER.
(Application filed May 4, 1899.)
(No Model.)
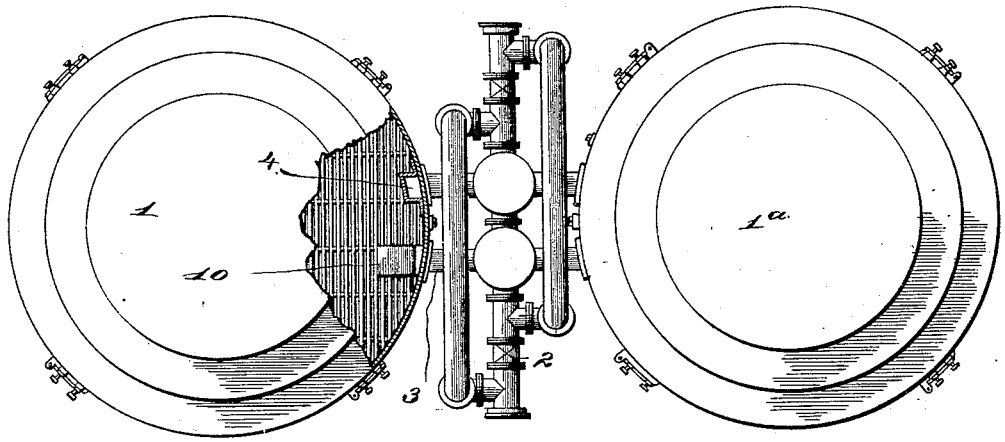
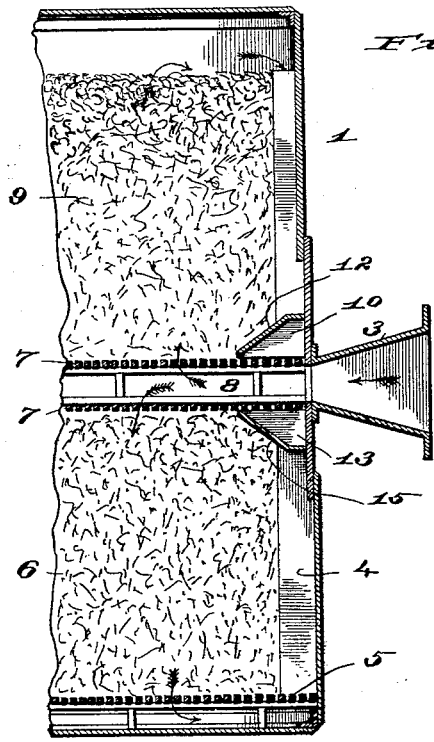
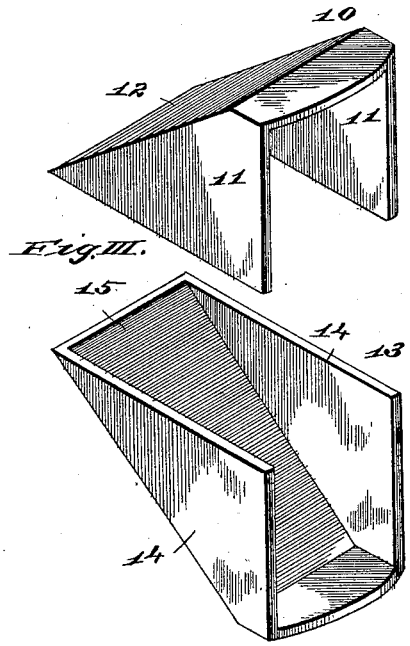
Witnesses
Inventor
Byron E. Chollar
By Wright Bro's
Attorneys

UNITED STATES PATENT OFFICE.

BYRON E. CHOLLAR, OF ST. LOUIS, MISSOURI.

GAS-PURIFIER.

SPECIFICATION forming part of Letters Patent No. 632,401, dated September 5, 1899.

Application filed May 4, 1899. Serial No. 715,505. (No model.)

*To all whom it may concern:*

Be it known that I, BYRON E. CHOLLAR, a citizen of the United States, residing at the city of St. Louis, in the State of Missouri, have invented certain new and useful Improvements in Gas-Purifiers, of which the following is a full, clear, and exact description, reference being had to the accompanying drawings, forming part of this specification.

The present invention relates to a gas-purifier of the type shown and described in application for patent filed by me August 5, 1898, Serial No. 687,773.

The purpose of the present improvement is to provide space-boxes at the inlet or outlet openings of the purifier-tanks described in the application for patent hereinbefore referred to, the said boxes being located both above and below said openings in order to provide for the ingress or egress of the gas to or from the purifying material, so as to avoid possibility of the said openings becoming closed by the settling or rising of the purifying material within the tank.

My invention consists in features of novelty hereinafter fully described and pointed out in the claim.

Figure I is a top view of a pair of purifying-tanks having piping connection, one of said tanks being shown partly broken away in horizontal section to illustrate the interior and show the upper space-box. Fig. II is an enlarged vertical sectional view of one of the tanks, taken on the line of the inlet or outlet and the space-boxes located thereat. Fig. III is a perspective view of the two space-boxes.

The purifier-tanks 1 and 1ᵃ and the piping 2, by which they are connected, are of substantially the same construction as that illustrated in my application for patent hereinbefore mentioned. The piping 2 is connected to both tanks, as described in said application, in such manner that a flow of gas therethrough may be accomplished to either tank as the initial receiver and from the first-entered tank to an outlet and again into said piping to the other tank, from which, after passing therethrough, it returns to the piping and is conveyed to a point of delivery. It is evident, therefore, that, as stated in the specification of the application hereinbefore referred to, the inlets or outlets of either tank may either of them be used as an outlet or inlet. I will, however, for convenience in description, refer to one of the openings as an "inlet" and the other opening as an "outlet," and with this understanding, alluding to Fig. II, 3 designates the inlet and 4 an outlet tube, the said inlet and outlet tubes being both arranged of open-topped filter-bed retaining-tanks proranged to communicate with the piping 2.

5 designates the lower layer of gridwork, on which a lower layer 6 of purifying material is laid.

7 designates a double gridwork containing a passage-way 8 therethrough, and 9 is the upper layer of purifying material supported by the double gridwork 7, which in turn is wholly supported by the layer 6 of purifying material. The layers of purifying material 6 and 9 and the double gridwork 7, located between them, being wholly supported by their own bodies within the purifier-tank, it is obvious that such parts are susceptible to a settling action, and that in such event the double gridwork 7 would be carried downwardly away from the opening 3, with which the passage-way 8 therein is adapted to communicate, and that therefore the free flow of gas into or out of the purifier-tank through said opening would be obstructed. Another difficulty liable to be encountered in the use of this type of purifying apparatus is that of the rising of the beds or layers of purifying material within the tanks by reason of the accumulation of sulfur deposited in the purifying material in the process of the purification of gas.

As is well known, crude coal-gas contains a large amount of sulfureted hydrogen which must be removed from the gas in effecting its purification. The sulfur of said sulfureted hydrogen is deposited in the layers 6 and 9 of purifying material, thereby increasing the bulk of the layers 6 and 9, according to the amount of sulfur deposited therein. By reason of this deposit of sulfur and increased bulk of the layers of purifying material the gridwork 7 is liable to be raised above its original position at the opening 3, in which event the passage-way 8 in said gridwork would be carried above the elevation of said opening. In order to overcome the difficulties liable to arise as stated, I locate space-boxes 10 and 13 above and below the double gridwork 7 at the location of the inlet or outlet 3, these boxes being adapted to fit loosely against the tank-wall, so that they may rise and fall with the said gridwork and layers of purifying material. The boxes 10 and 13 are shown in detail in Fig. III. The box 10 is composed of side walls 11 and a tapering wall 12, and is open at its under side and also open at the side that rests against the tank-wall. The box 13 has side walls 14. A tapering wall 15 is open at its upper side where it rests against the under side of the gridwork 7 and is also open at its side which bears in contact with the tank-wall. By the use of these boxes the purifying material is held away from the opening 3, and in the event of such material settling or rising within the tank the said boxes move accordingly, so as to provide for the certainty of space from the passage-way in the double gridwork to the opening 3 or from the opening 3 into said passage-way, according to the direction of flow, thereby avoiding liability of the said opening becoming clogged.

I claim as my invention—

In a gas-purifier, the combination of a tank, a lower gridwork located therein, a lower layer of purifying material mounted on said gridwork, a double gridwork on said lower layer of purifying material, provided with a gas passage-way extending laterally therethrough, said tank being provided with an inlet or outlet located in proximity to the passage-way in said double gridwork, an upper layer of purifying material mounted on said double gridwork and wholly supported thereby, and space-boxes located above and below said double gridwork at said inlet or outlet, substantially as described.

BYRON E. CHOLLAR.

In presence of—
　E. S. KNIGHT,
　G. A. TAUBERSCHMIDT.